US009970592B2

(12) United States Patent
Wu et al.

(10) Patent No.: US 9,970,592 B2
(45) Date of Patent: May 15, 2018

(54) DETACHABLE MOUNTING DEVICE

(71) Applicant: HANWIT PRECISION INDUSTRIES LTD., New Taipei (TW)

(72) Inventors: Ming-De Wu, New Taipei (TW); Chih-Yuan Chen, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 0 days. days.

(21) Appl. No.: 15/233,109

(22) Filed: Aug. 10, 2016

(65) Prior Publication Data

US 2018/0045364 A1 Feb. 15, 2018

(51) Int. Cl.

*A47F 5/08* (2006.01)
*F16M 13/02* (2006.01)
*A47B 95/02* (2006.01)

(52) U.S. Cl.

CPC ............. *F16M 13/02* (2013.01); *A47B 95/02* (2013.01); *A47B 2095/024* (2013.01)

(58) Field of Classification Search

USPC ....................................................... 248/231.9
See application file for complete search history.

(56) References Cited

U.S. PATENT DOCUMENTS 5,000,411 A * 3/1991 Primeau ................. A47K 10/10 248/223.41
5,875,903 A * 3/1999 Chen ...................... A47K 10/10 211/105.1
6,019,233 A * 2/2000 Yu .......................... A47H 1/102 211/87.01
6,817,044 B1 * 11/2004 Ouyoung ............... A47K 10/04 211/105.1
8,104,726 B2 * 1/2012 Hoernig ............... A47K 17/022 248/220.22
8,671,545 B1 * 3/2014 Zimmerman .......... F16M 13/02 211/123
8,990,973 B2 * 3/2015 Graff ...................... A47K 3/003 4/559
2002/0023993 A1 * 2/2002 Fleischmann .......... A47K 10/10 248/315

(Continued)

*Primary Examiner* — Monica E Millner
(74) *Attorney, Agent, or Firm* — Muncy, Geissler, Olds & Lowe, P.C.

(57) ABSTRACT

Detachable mounting device includes mounting member defining therein accommodation open chamber, mounting through hole, annular inside flange between accommodation open chamber and mounting through hole and annular positioning groove between annular inside flange and mounting through hole, and fastening member having head positioned in the annular positioning groove and fastening shank suspending in the mounting through hole and adapted for fastening to mating connection member of predetermined panel member to secure the mounting member to the predetermined panel member. The outer diameter of the fastening member is larger than the inner diameter of the annular inside flange and the inner diameter of the mounting through hole, so that the fastening member is prohibited from falling out of the annular positioning groove. The wide top and narrow bottom design of the mounting member facilitates user holding the base portion with the hand to lift and delivery the predetermined panel member conveniently.

8 Claims, 8 Drawing Sheets

(56) References Cited

U.S. PATENT DOCUMENTS

| | | | | | |
|---|---|---|---|---|---|
| 2008/0138054 | A1* | 6/2008 | Short | A47K 10/06 392/485 | |
| 2009/0214318 | A1* | 8/2009 | Bowden | A47K 17/022 411/341 | |
| 2012/0145854 | A1* | 6/2012 | Smith | A47K 10/10 248/226.11 | |
| 2013/0299655 | A1* | 11/2013 | Sader | F24J 2/5205 248/231.9 | |

* cited by examiner

DETACHABLE MOUNTING DEVICE

BACKGROUND OF THE INVENTION

1. Field of the Invention

The present invention relates to a detachable mounting device, which uses a fastening member to detachably fasten a funnel-shaped mounting member to a predetermined panel member so that a user can grip the wide top-sided base portion of the mounting member with the hand to lift and delivery the predetermined panel member conveniently.

2. Description of the Related Art

When joining metal panel members, fastening devices consisting of a lock screw, a rotary knob and a washer are commonly used. During application, the lock screw, rotary knob and washer of each fastening device are assembled and then mounted at a first metal panel member. When fastening the first metal panel member to a second metal panel member, rotate the rotary knob of each fastening device to drive the respective lock screw into a respective mounting screw hole at the second metal panel member, and then use a hand tool to fasten tight the lock screw. This metal panel member fastening method can be used in telecommunication cabinets, industrial computers, machine tools and other situations where metal panel members are to be fastened in a stack.

However, different telecommunication cabinets, industrial computers or machine tools from different providers use different designs of board sets, drawers and/or keyboard racks. The installation and application of telecommunication cabinets, industrial computers and machine tools must consider the overall system stability and the factor of maintenance and replacement convenience. Therefore, the outer shells or board sets of telecommunication cabinets, industrial computers and machine tools are commonly equipped with a grip for gripping by the user. A grip for this purpose has two mounting ends that are fastened to a panel member with respective screws. Screws can be directly fastened to respective mounting screw holes of a panel member to affix the grip to the panel member. Screws can also be inserted through respective through holes on a first panel member and then fastened to respective mounting screw holes on a second panel member to fixedly secure the grip to the stacked first panel member and second panel member. This method allows the user to rapidly and detachably fasten the grip to the outer shell or board set of the telecommunication cabinet, industrial computer or machine tool. However, the installation of the grip occupies much surface area of the outer shell or board set of the telecommunication cabinet, industrial computer or machine tool and significantly increases the overall height of the telecommunication cabinet, industrial computer or machine tool, affecting the utilization of the surface area of the outer shell or board set. If we increase the surface area of the panel member in order for the installation of the grip, the material cost of the panel member will be relatively increased. Therefore, there is still room for improvement.

SUMMARY OF THE INVENTION

The present invention has been accomplished under the circumstances in view. It is therefore the main object of the present invention to provide a detachable mounting device, which uses a fastening member to detachably fasten a funnel-shaped mounting member to a predetermined panel member so that a user can grip the wide top-sided base portion of the mounting member with the hand to lift and delivery the predetermined panel member conveniently.

To achieve this and other objects of the present invention, a detachable mounting device comprises a mounting member and a fastening member. The mounting member comprises a base portion, an extension portion downwardly extended from the bottom side of the base portion, an accommodation open chamber defined in the base portion and an upper part of the extension portion, a mounting through hole axially cut through the remote bottom side of the extension portion in communication with the accommodation open chamber, a stepped annular stop edge defined in the extension portion between the mounting through hole and the accommodation open chamber, an annular inside flange extended around the periphery of the accommodation open chamber within the extension portion and spaced above the stepped annular stop edge, and an annular positioning groove defined in the extension portion between the mounting through hole and the annular inside flange. Further, the mounting through hole has a diameter relatively smaller than the diameter of the accommodation open chamber. The fastening member is detachably mounted in the mounting member and fastenable to a mounting screw hole in a mating connection member of an external panel member to fixedly secure the mounting member to the mating connection member. Further, the fastening member comprises a head positioned in the annular positioning groove of the mounting member between the mounting through hole and the annular inside flange, a driving portion located on the top side of the head for the positioning of a hand tool for rotating the fastening member, and a fastening shank downwardly extended from the opposing bottom side of the head and suspended in the mounting through hole of the mounting member. Further, the outer diameter of the fastening member is larger than the inner diameter of the annular inside flange and the inner diameter of the mounting through hole. Thus, the head of the fastening member is prohibited from escaping out of the annular positioning groove. After fastened up the fastening member to fixedly secure the mounting member to the mating connection member of the predetermined panel member, the user can grip the wide base portion of the mounting member with the hand to lift and carry the predetermined panel member conveniently.

Further, the extension portion of the mounting member has an outer diameter gradually reducing in direction away from the base portion. Preferably, the base portion and extension portion of the mounting member are so configured that the mounting member exhibits a funnel-like shape.

Preferably, the mounting member further comprises at least one supporting member disposed in the mounting through hole inside the extension portion for supporting the mating connection member of the predetermined panel member in position after insertion of the mating connection member into the mounting through hole of the mounting member. Further, the at least one supporting member being selectively made in the form of a cylinder, triangular prism, rectangular prism, polygonal prism or sawtooth-shaped column.

Further, in an alternate form of the present invention, the detachable mounting device comprises two mounting members arranged in parallel, two fastening members respectively and detachably mounted in the accommodation chambers of the respective mounting members for fastening the respective mounting members to respective mating connection members of the predetermined panel member, and a connection bar connected between the base portions of the two mounting members. The connection bar works as a grip for gripping by the user, enabling the user to lift and carry the predetermined panel member conveniently with the hand.

Further, the fastening member can be made in the form of a screw or bolt. Further, the fastening member comprises a driving portion located on the head of the fastening member. The driving portion can be a blade-type, Phillips, hexagonal or polygonal slot, groove or recess for the fitting of a blade-type, Phillips, hexagonal or polygonal tip of a mating hand tool (screwdriver, wrench or ratchet wrench) that is operable to drive the head in rotating the fastening shank.

Other and further benefits, advantages and features of the present invention will be understood by reference to the following specification in conjunction with the accompanying drawings, in which like reference characters denote like elements of structure.

DETAILED DESCRIPTION OF THE PREFERRED EMBODIMENT

Figure 1:
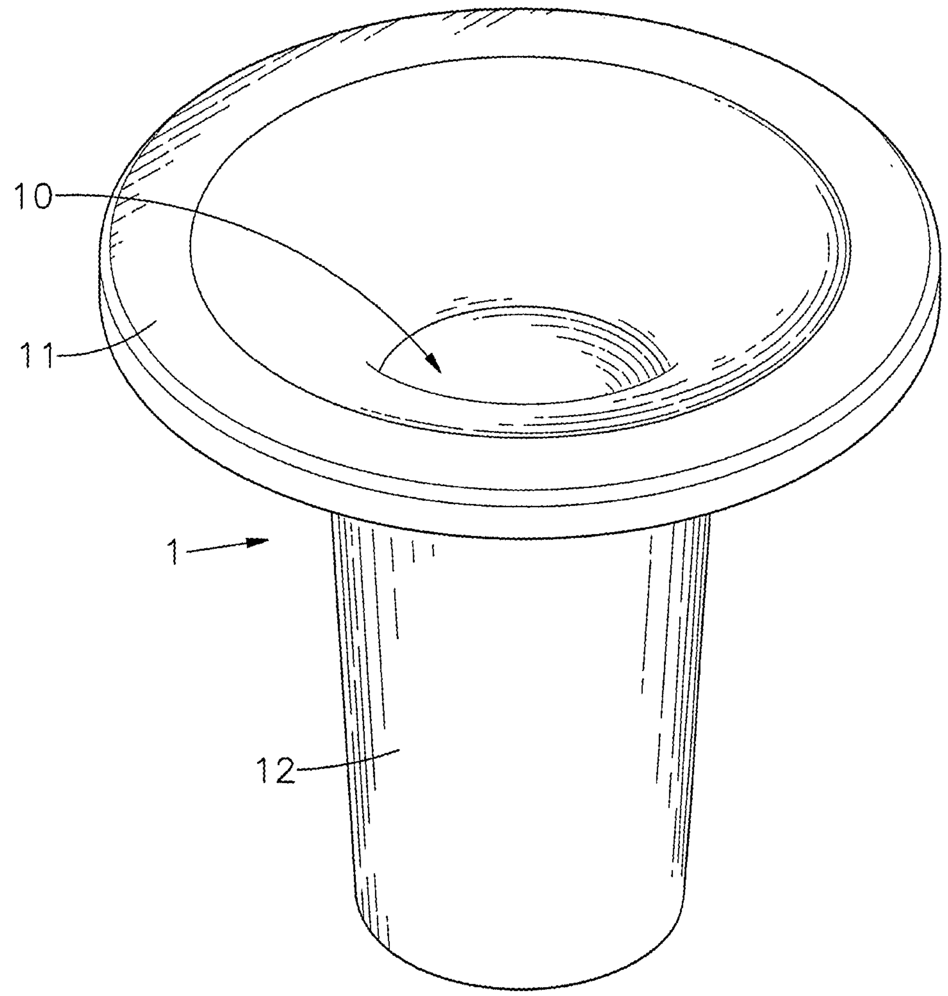
FIG. 1 is an oblique top elevational view of a detachable mounting device in accordance with the present invention.
Figure 2:
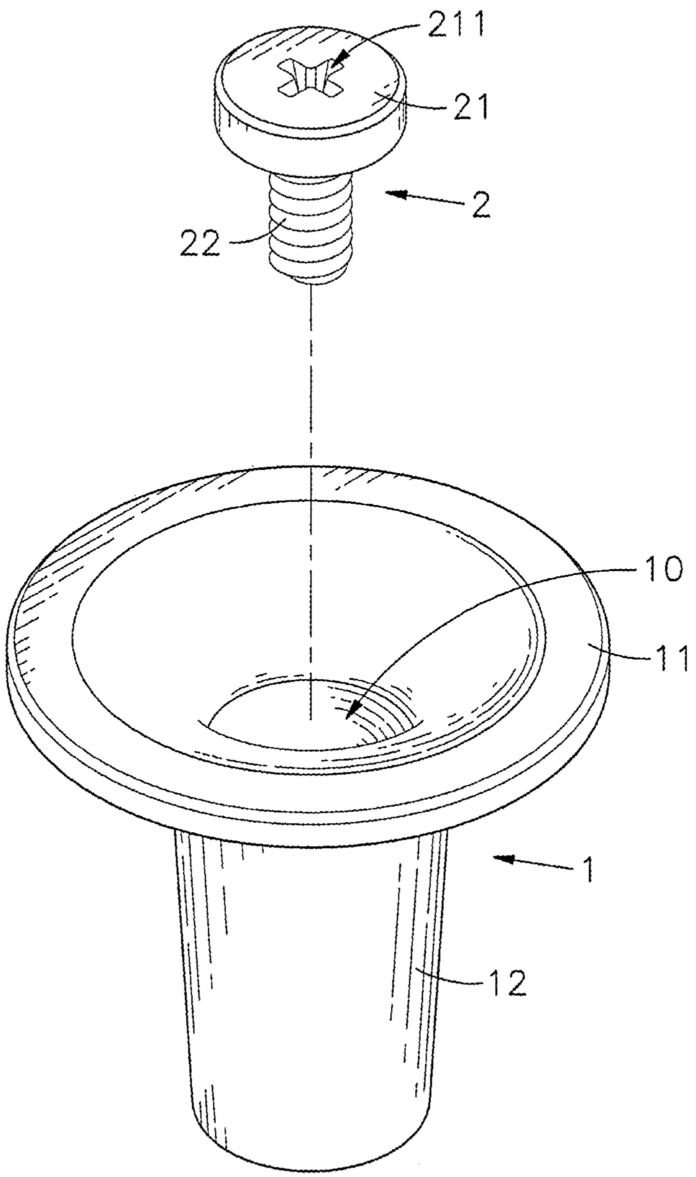
FIG. 2 is an exploded view of the detachable mounting device in accordance with the present invention.
Figure 3:
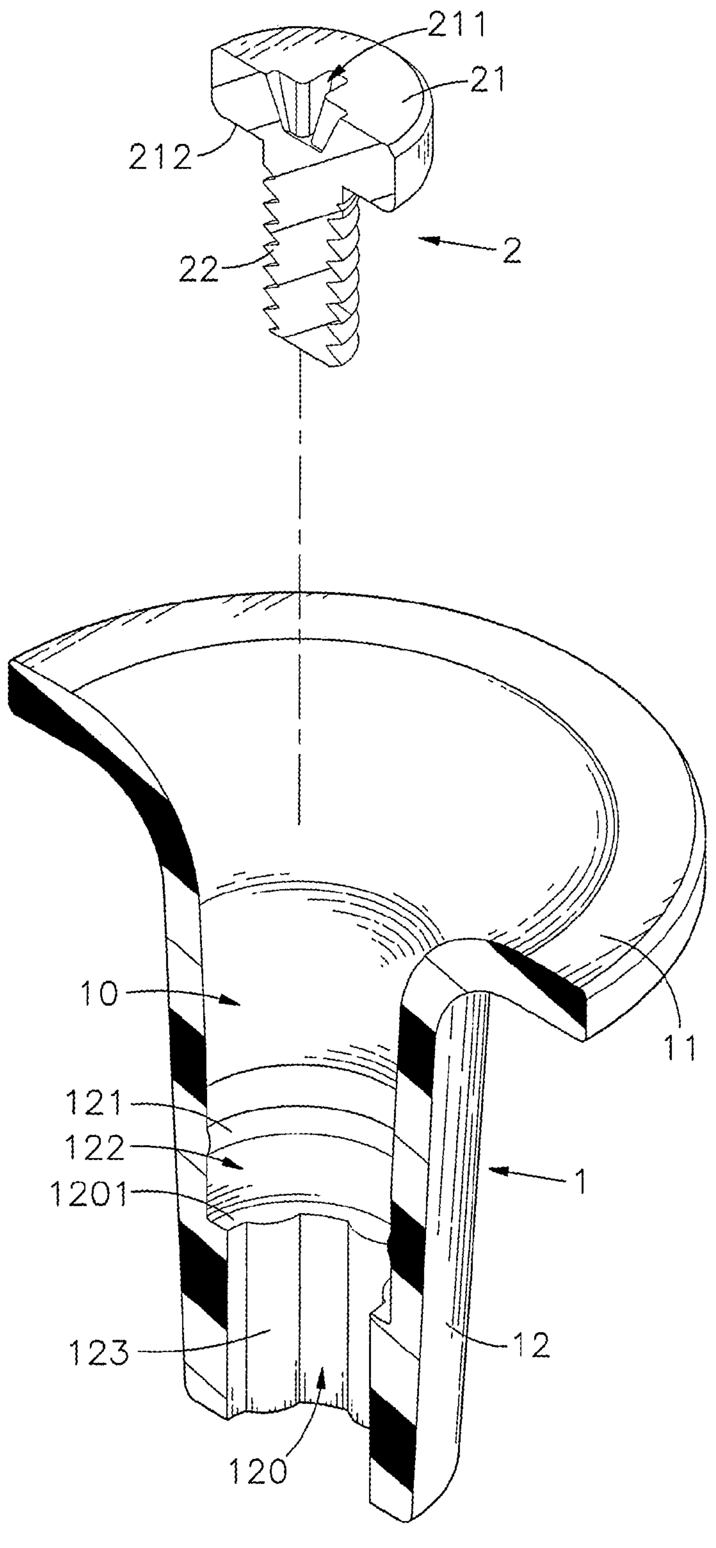
FIG. 3 is a sectional exploded elevational view of the detachable mounting device in accordance with the present invention.
Figure 4:
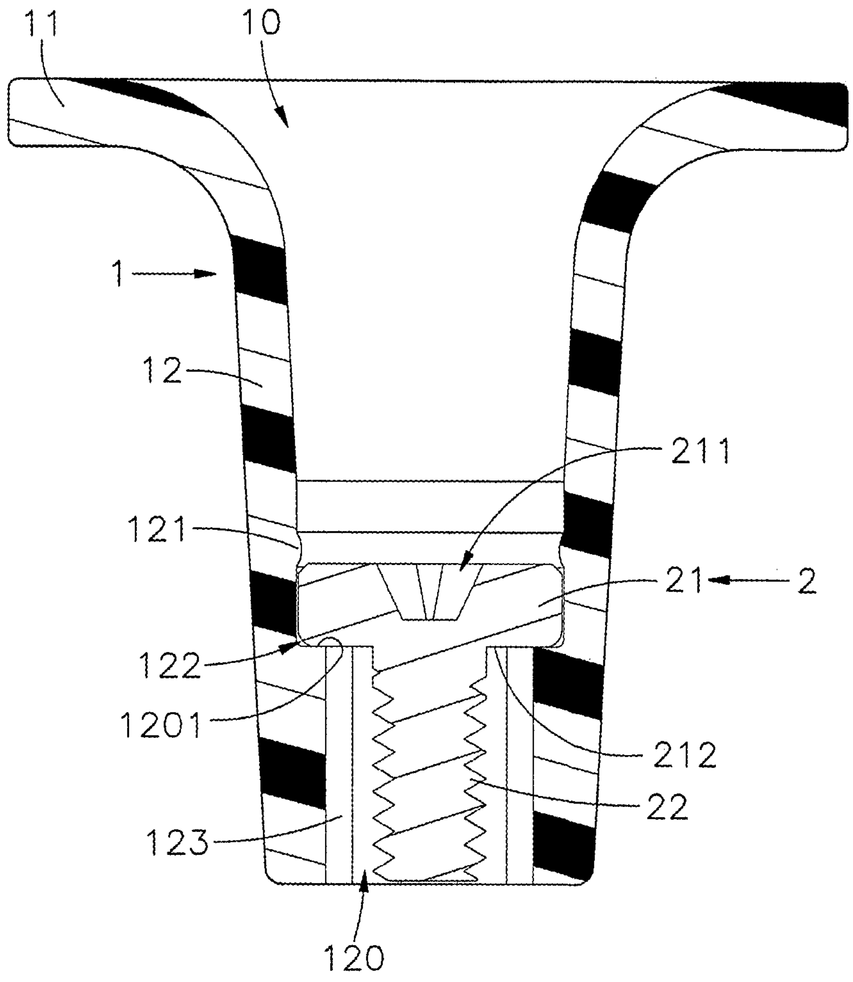
FIG. 4 is a sectional side view of the detachable mounting device in accordance with the present invention.
Figure 5:
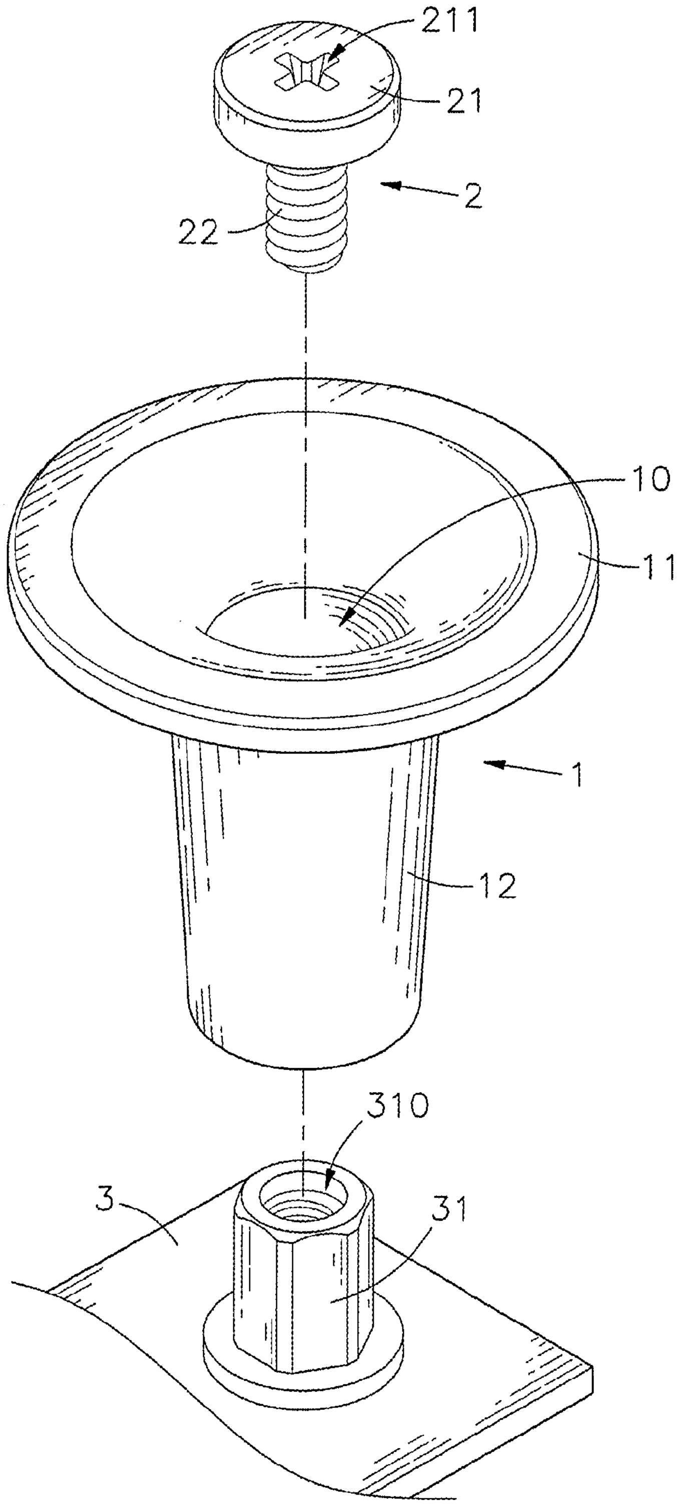
FIG. 5 is an exploded applied view, showing an application example of the detachable mounting device in accordance with the present invention.
Figure 6:
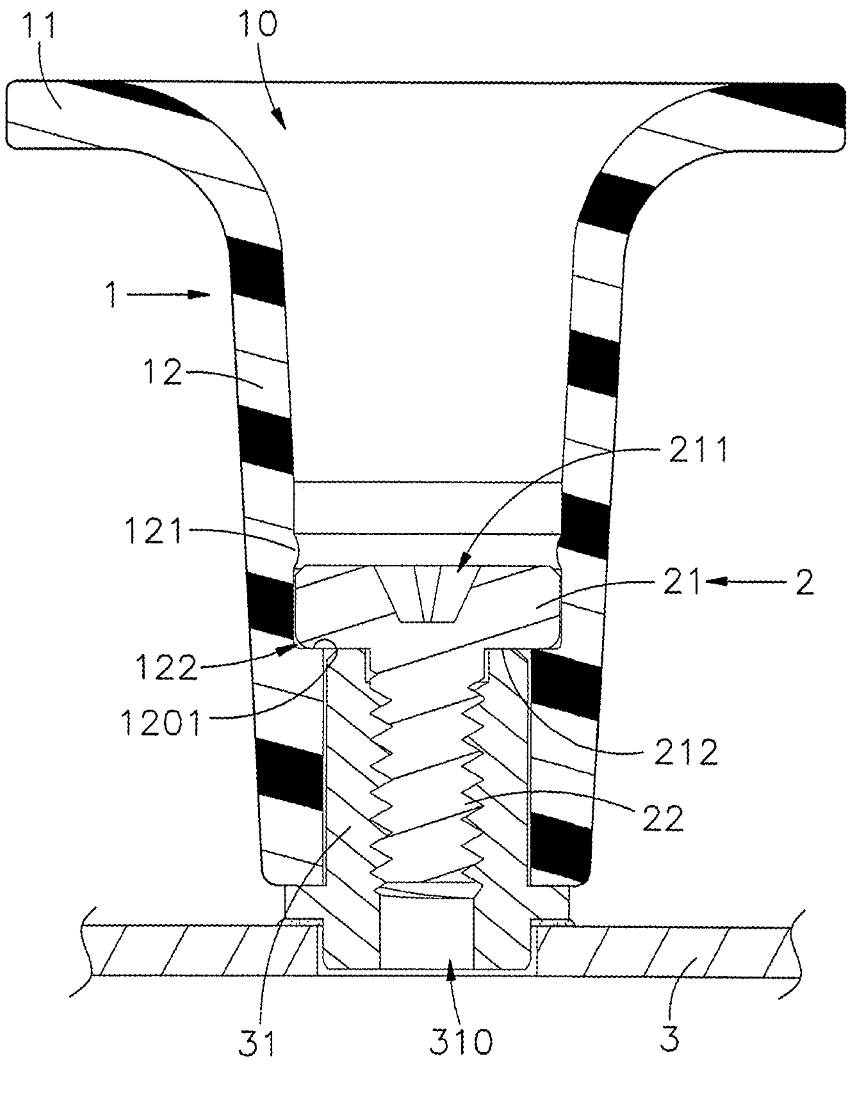
FIG. 6 is a sectional side assembly view of FIG. 5.
Figure 7:
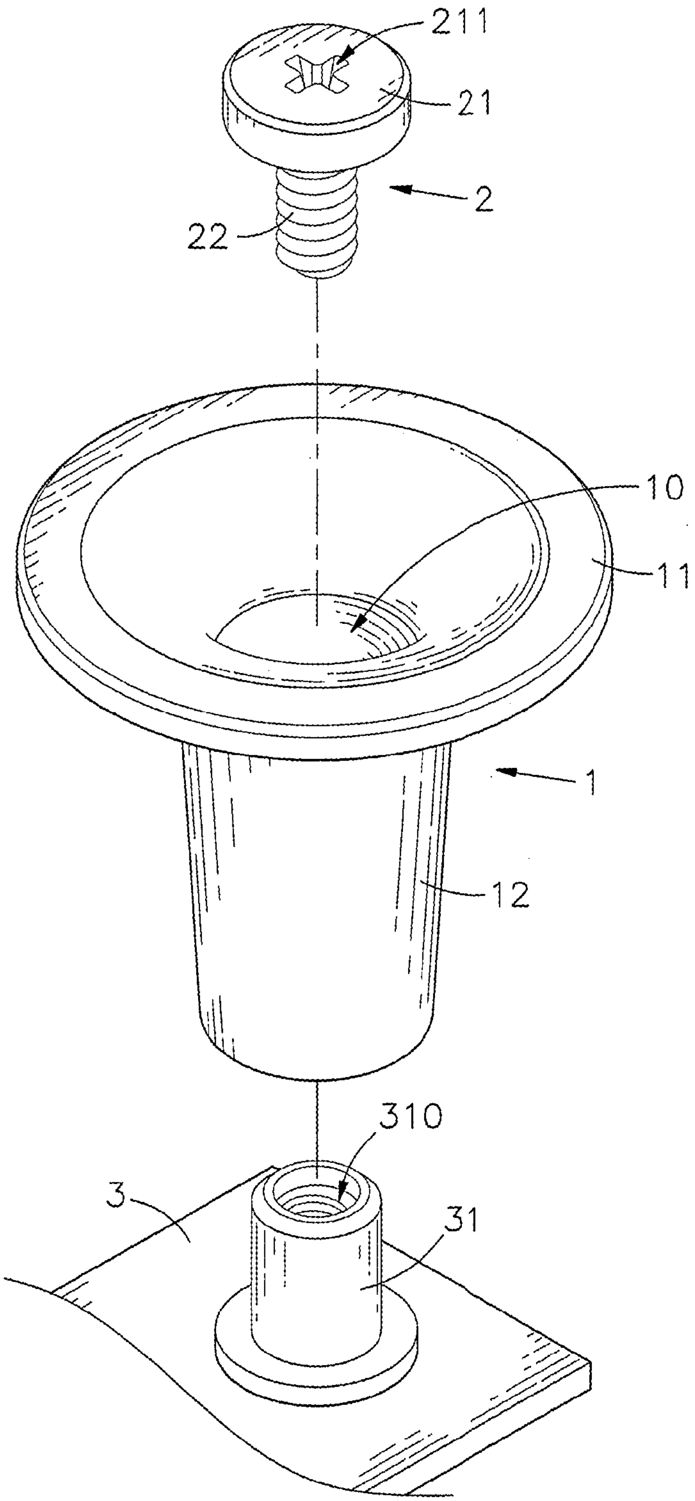
FIG. 7 is an exploded applied view, showing another application example of the detachable mounting device in accordance with the present invention.

Referring to FIGS. 1-4, an oblique top elevational view of a detachable mounting device, an exploded view of the detachable mounting device, a sectional exploded view of the detachable mounting device and a sectional side view of the detachable mounting device are shown. The detachable mounting device comprises a mounting member 1 and a fastening member 2.

The mounting member 1 comprises a base portion 11, an extension portion 12 downwardly extended from a bottom side of the base portion 11, an accommodation open chamber 10 defined in the base portion 11 and an upper part of the extension portion 12 in communication with the space outside the mounting member 1, a mounting through hole 120 axially cut through a remote bottom side of the extension portion 12 in communication with the accommodation open chamber 10 and having a diameter relatively smaller than the accommodation open chamber 10, a stepped annular stop edge 1201 defined in the extension portion 12 between the mounting through hole 120 and the accommodation open chamber 10, an annular inside flange 121 extended around the periphery of the accommodation open chamber 10 within the extension portion 12 and spaced above the stepped annular stop edge 1201, and an annular positioning groove 122 defined within the extension portion 12 between the mounting through hole 120 and the annular inside flange 121.

The fastening member 2 comprises a head 21, a driving portion 211 located on one side, namely, the top side of the head 21, and a fastening shank 22 downwardly extended from an opposite side, namely, the bottom side of the head 21.

When assembling the detachable mounting device, downwardly insert the fastening member 2 into the accommodation open chamber 10 of the mounting member 1 to force the head 21 of the fastening member 2 downwardly over the annular inside flange 121 into the annular positioning groove 122 and to suspend the fastening shank 22 in the mounting through hole 120, and thus, the mounting member 1 and the fastening member 2 are assembled.

The base portion 11 of the mounting member 1 has an outer diameter larger than the outer diameter of the extension portion 12, so that the mounting member 1 exhibits a funnel-like shape (i.e., the mounting member 1 has an outer diameter gradually reducing in direction from the base portion 11 toward the extension portion 12), the annular positioning groove 122 and the annular inside flange 121 defined in the extension portion 12 for enabling the head 21 of the fastening member 2 to be positioned in the annular positioning groove 122. Further, the outer diameter (D) of the head 21 is larger than the inner diameter (D1) of the annular inside flange 121 and the inner diameter (D2) of the mounting through hole 120; the inner diameter (D1) of the annular inside flange 121 is larger than the inner diameter (D2) of the mounting through hole 120 (i.e., D>D1>D2). When the fastening member 2 is mounted in the accommodation open chamber 10, the bottom abutment surface 212 of the head 21 is abutted at the stepped annular stop edge 1201 above the mounting through hole 120 and the border edge of the top surface of the head 21 is stopped against the annular inside flange 121, and thus, the head 21 is positively positioned in the annular positioning groove 122, holding the fastening member 2 firmly in the annular positioning groove 122 and the mounting through hole 120 within the extension portion 12 of the mounting member 1 and preventing the fastening member 2 from escaping out of the mounting member 1.

Further, the mounting member 1 can also be configured to provide at least one supporting member 123 in the mounting through hole 120 of the extension portion 12 below the accommodation open chamber 10. In the present preferred embodiment, multiple supporting members 123 are equiangularly spaced around and formed integral with the inner perimeter of the mounting through hole 120. These supporting members 123 can be made in the form of a cylinder, triangular prism, rectangular prism, polygonal prism or sawtooth-shaped column.

Further, the driving portion 211 on the top surface of the head 21 of the fastening member 2 can be a blade-type, Phillips, hexagonal or polygonal slot, groove or recess for the fitting of a blade-type, Phillips, hexagonal or polygonal tip of a mating hand tool (screwdriver, wrench or ratchet wrench) that is operable to drive the head 21 in rotating the fastening shank 22. Further, the fastening shank 22 can be made in the shape of the threaded shank of a screw or bolt.

Referring to FIGS. 5-8 and FIG. 3 again, after loading of the fastening member 2 in the accommodation open chamber 10 of the mounting member 1, the user can insert a hand tool (such as screwdriver, Allen wrench, etc.) downwardly into the accommodation open chamber 10 in the base portion 11 of the mounting member 1 to engage the tip of the hand tool into the driving portion 211 on the head 21 of the fastening member 2 and then operate the hand tool to rotate the head 21 and fastening shank 22 of the fastening member 2, driving the fastening shank 22 into a mounting screw hole 310 in a mating connection member 31 of a predetermined panel member 3 and simultaneously causing the mating connection member 31 to engage into the mounting through hole 120 in the extension portion 12. Further, the mating connection member 31 can be a screw nut, or a cylindrical, hexagonal or polygonal column that has the aforesaid mounting screw hole 310 defined therein. When the mating connection member 31 enters the mounting through hole 120 in the extension portion 12, the peripheral wall of the mating connection member 31 is forced into abutment against the supporting members 123 in the mounting through hole 120, enhancing positioning stability of the mating connection member 31 in the mounting through hole 120 and preventing relative vibration, rotation or displacement between the mounting member 1 and the predetermined panel member 3. Further, the wide top and narrow bottom design of the mounting member 1 facilitates a user holding the base portion 11 with the hand to lift and delivery the predetermined panel member 3 conveniently. Further, the configuration design of the mounting member 1 with the wide base portion 11 at the top side and the narrow extension portion 12 at the bottom side keeps the base portion 11 spaced above the predetermined panel member 3 at a certain distance without occupying the surface area of the predetermined panel member 3, and thus, the installation of the mounting member 1 does not significantly affect the utilization of the surface area of the predetermined panel member 3 for the installation of related component parts.

Figure 8:
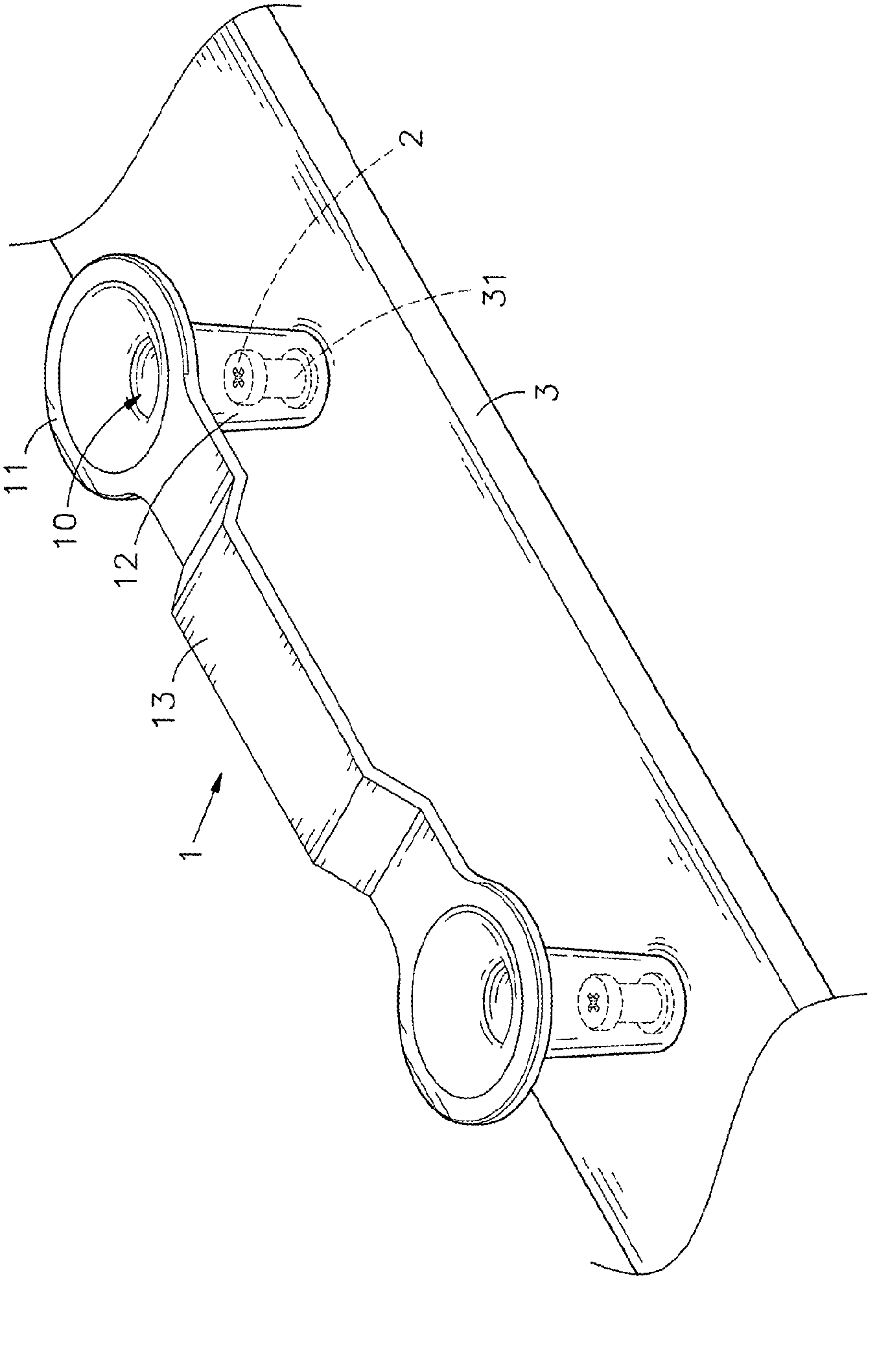
FIG. 8 illustrates an alternate form of the detachable mounting device in accordance with the present invention.

Further, in an alternate form of the present invention, as shown in FIG. 8, the detachable mounting device comprises two mounting members 1 arranged in parallel, two fastening members 2 respectively mounted in the mounting members 1 for fastening the mounting members 1 to respective mating connection members 31 of the predetermined panel member 3, and a connection bar 13 connected between the base portions 11 of the two mounting members 1. The connection bar 13 works as a grip for gripping by the user, enabling the user to lift and carry the predetermined panel member 3 conveniently with the hand.

As described above, the base portion 11 of the mounting member 1 is made relatively wider and the extension portion 12 of the mounting member 1 is made relatively narrower, and thus, the mounting member 1 exhibits a funnel-like shape conveniently for gripping by hand. Further, the accommodation open chamber 10 is defined in the base portion 11 and the upper part of the extension portion 12; the mounting through hole 120 is defined in the extension portion 12 in communication with the accommodation open chamber 10; the annular positioning groove 122 is defined in the extension portion 12 between the annular inside flange 121 and the mounting through hole 120. Further, the fastening member 2 is mounted in the accommodation open chamber 10 with the head 21 positioned in the annular positioning groove 122 and stopped at the bottom side of the annular inside flange 121 and the fastening shank 22 suspended in the mounting through hole 120. Thus, the fastening member 2 is positively secured in the accommodation open chamber 10 of the mounting member 1 and prohibited from escaping out of the mounting member 1. In installation, the fastening shank 22 of the fastening member 2 is threaded into the mounting screw hole 310 in the mating connection member 31 of the predetermined panel member 3, causing the mating connection member 31 to get into the mounting through hole 120 in the extension portion 12 and to peripherally abut against the supporting members 123. At this time, the mounting member 1 is firmly secured to the predetermined panel member 3. Thus, the user can grip the wide base portion 11 of the mounting member 1 with the hand to lift and carry the predetermined panel member 3 conveniently.

In conclusion, the invention provides a detachable mounting device consisting of a mounting member and a fastening member for installation in a mating connection member of a predetermined panel member so that the user can grip the mounting member with the hand to lift and carry the predetermined panel member conveniently. Further, the mounting member comprises a base portion, an extension portion downwardly extended from the bottom side of the base portion, an accommodation open chamber defined in the base portion and an upper part of the extension portion, a mounting through hole axially cut through the remote bottom side of the extension portion in communication with the accommodation open chamber, a stepped annular stop edge defined in the extension portion between the mounting through hole and the accommodation open chamber, an annular inside flange extended around the periphery of the accommodation open chamber within the extension portion and spaced above the stepped annular stop edge, and an annular positioning groove defined in the extension portion between the mounting through hole and the annular inside flange. Further, the mounting through hole has a diameter relatively smaller than the diameter of the accommodation open chamber. The fastening member is detachably mounted in the mounting member and fastenable to a mounting screw hole in a mating connection member of an external panel member to fixedly secure the mounting member to the mating connection member. Further, the fastening member comprises a head positioned in the annular positioning groove of the mounting member between the mounting through hole and the annular inside flange, a driving portion located on the top side of the head for the positioning of a hand tool for rotating the fastening member, and a fastening shank downwardly extended from the opposing bottom side of the head and suspended in the mounting through hole of the mounting member. Further, the outer diameter of the fastening member is larger than the inner diameter of the annular inside flange and the inner diameter of the mounting through hole. After fastened up the fastening member to fixedly secure the mounting member to the mating connection member of the predetermined panel member, the user can grip the wide base portion of the mounting member with the hand to lift and carry the predetermined panel member conveniently.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A detachable mounting device, comprising:

at least one mounting member, each of said at least one mounting member comprising a base portion, an extension portion downwardly extended from a bottom side of said base portion, an accommodation open chamber defined in said base portion and an upper part of said extension portion in communication with a space outside of said at least one mounting member, a mounting through hole axially cut through a remote bottom side of said extension portion in communication with said accommodation open chamber, said mounting through hole having a diameter relatively smaller than a diameter of said accommodation open chamber, a stepped annular stop edge defined in said extension portion between said mounting through hole and said accommodation open chamber, an annular inside flange extended around a periphery of said accommodation open chamber within said extension portion and spaced above said stepped annular stop edge, and an annular positioning groove defined in said extension portion between said mounting through hole and said annular inside flange; and a fastening member detachably mounted in each of said at least one mounting member and fastenable to a mounting screw hole in a mating connection member of an external panel member to fixedly secure said at least one mounting member to said mating connection member, said fastening member comprising a head positioned in said annular positioning groove between said mounting through hole and said annular inside flange, a driving portion located on a top side of said head configured to position a hand tool for rotating said fastening member, and a fastening shank downwardly extended from an opposing bottom side of said head and suspended in said mounting through hole of said mounting member.

2. The detachable mounting device as claimed in claim 1, wherein said extension portion has an outer diameter gradually reducing in direction away from said base portion.

3. The detachable mounting device as claimed in claim 2, wherein said base portion and said extension portion of each of said at least one mounting member are so configured that said mounting member exhibits a funnel-like shape.

4. The detachable mounting device as claimed in claim 2, which comprises of two mounting members arranged in parallel, two fastening members that are respectively and detachably mounted in the said accommodation chambers of said two mounting members for fastening said two mounting members to respective mating connection members of a predetermined panel member, and a connection bar connected between the respective said base portions of each of said two mounting members.

5. The detachable mounting device as claimed in claim 1, wherein said fastening shank of each said fastening member is a threaded shank for fastening to a mounting screw hole in a mating connection member of an external panel member.

6. The detachable mounting device as claimed in claim 1, wherein each of said at least one mounting member further comprises at least one supporting member disposed in said mounting through hole inside said extension portion for supporting an external mating connection member, each said supporting member being selectively made in the form of a cylinder, triangular prism, rectangular prism, polygonal prism or sawtooth-shaped column.

7. The detachable mounting device as claimed in claim 1, wherein said driving portion on said head of said fastening member is made in one the forms of blade-type, Phillips, hexagonal and polygonal slots, grooves and recesses.

8. The detachable mounting device as claimed in claim 1, wherein the outer diameter of said head of said fastening member is larger than an inner diameter of said annular inside flange and an inner diameter of said mounting through hole.

* * * * *